(12) United States Patent
Park

(10) Patent No.: US 7,659,951 B2
(45) Date of Patent: Feb. 9, 2010

(54) DIRECT LIGHT TYPE BACKLIGHT UNIT AND LIQUID CRYSTAL DISPLAY

(75) Inventor: Sang-moo Park, Uijeongbu-si (KR)

(73) Assignee: Samsung Electronics Co., Ltd., Swon-si (KR)

( * ) Notice: Subject to any disclaimer, the term of this patent is extended or adjusted under 35 U.S.C. 154(b) by 348 days.

(21) Appl. No.: 11/476,621

(22) Filed: Jun. 29, 2006

(65) Prior Publication Data

US 2007/0047221 A1 Mar. 1, 2007

(30) Foreign Application Priority Data

Aug. 26, 2005 (KR) ...................... 10-2005-0078883

(51) Int. Cl.
*G02F 1/1335* (2006.01)
(52) U.S. Cl. .......................... 349/65; 349/61
(58) Field of Classification Search .............. 349/61–71
See application file for complete search history.

(56) References Cited

U.S. PATENT DOCUMENTS

| 6,151,166 | A | 11/2000 | Matsushita et al. |
| 6,351,334 | B1 | 2/2002 | Hsieh et al. |
| 7,164,454 | B2 * | 1/2007 | Numata et al. ................. 349/95 |
| 2002/0167619 | A1 | 11/2002 | Bietsch et al. |
| 2005/0041174 | A1 | 2/2005 | Numata et al. |

FOREIGN PATENT DOCUMENTS

| JP | 09-186825 A | 7/1997 |
| JP | 2001-312916 A | 11/2001 |
| KR | 10-2004-0021178 A | 3/2004 |

* cited by examiner

*Primary Examiner*—Kevin S Wood
(74) *Attorney, Agent, or Firm*—Sughrue Mion, PLLC

(57) ABSTRACT

A direct light type backlight unit and a liquid crystal panel employing the same. The backlight unit includes a plurality of light emitting devices disposed at a predetermined angle on a substrate; and a grating which diffracts incident light from the light emitting devices at different diffraction angles to separate the incident light into a plurality of colored light beams. The backlight unit and the liquid crystal display include direct light type light sources emitting light at an optimal angle to provide maximum diffraction efficiency of the grating, which allows color image realization without the use of a color filter.

10 Claims, 1 Drawing Sheet

DIRECT LIGHT TYPE BACKLIGHT UNIT AND LIQUID CRYSTAL DISPLAY

CROSS-REFERENCE TO RELATED PATENT APPLICATION

This application claims priority from Korean Patent Application No. 10-2005-0078883, filed on Aug. 26, 2005, in the Korean Intellectual Property Office, the disclosure of which is incorporated herein in its entirety by reference.

BACKGROUND OF THE INVENTION

1. Field of the Invention

The present invention relates to a direct light type backlight unit and a large-sized liquid crystal display that does not include a color filter.

2. Description of the Related Art

In general, liquid crystal displays (LCDs), which are flat panel displays used in lap top computers, desktop computers, LCD TVs, and mobile communication terminals, are light receiving devices which do not form images by themselves, but by receiving light from an external source, and need a backlight unit in addition to a liquid crystal panel. A backlight unit is installed behind a liquid crystal display and serves as a light source to emit light.

According to the arrangement of a light source, the backlight unit can be classified as either a direct light type backlight unit in which a plurality of lamps installed directly under a liquid crystal display emit light directly to a liquid crystal panel, or an edge light type backlight unit in which a lamp installed at an edge of a light guide panel (LGP) emits light and the light is transferred to a liquid crystal panel.

When a color filter is used to realize a color image, light efficiency is decreased and manufacturing costs of a liquid crystal display are increased. In order to solve this problem, a color image forming technique of applying a grating instead of using a color filter to separate colors has been suggested.

FIG. 1 illustrates a conventional liquid crystal display using an edge light type backlight unit. The liquid crystal display includes a light source 10 and a light guide panel 15 guiding the light from the light source 10 onto the liquid crystal panel 30. A cold cathode fluorescent lamp (CCFL) is used as a light source, but a CCFL has a low color realization rate and thus does not provide high image quality and is not appropriate for high resolution TVs or monitors. The light guide panel 15 is tapered to guide the light emitted from the light source 10 efficiently and distribute the light uniformly.

A reflection panel 20 is formed below the light guide panel 15 to reflect the light transmitted from the light guide panel 15 back to the light guide panel 15. A grating 23 is formed on the upper surface of the light guide panel 15 to diffract incident white light at different angles according to wavelength to separate the white light. It is important for the light to be incident at an optimal angle of incidence for maximum diffraction efficiency to improve the light efficiency. However, it is difficult to minutely control the angle of incidence of the light which is guided by the light guide panel 15 and incident on the grating 23.

The color light emitted from the grating 23 is focused on the liquid crystal panel 30 through a cylindrical micro lens array 25. The grating 23 diffracts light, for example, red light (R), green light (G), and blue light (B), at different diffraction angles so that the light is incident on corresponding pixels of the liquid crystal panel 30. The liquid crystal panel controls the colored light by switching the pixels on and off according to input image signals to form a color image. A diffuser 35 diffuses the image formed by the liquid crystal panel 30 to increase a viewing angle.

As described above, in the edge light type backlight unit, it is difficult to control light to be incident on a grating at an optimal angle of incidence. Since light is deflected from one direction to another by a light guide panel, light uniformity may not be secured. Thus, the size of liquid crystal displays is limited.

SUMMARY OF THE INVENTION

The present invention provides a backlight unit having a light source which allows light to be incident on a grating at an angle of incidence at which the diffraction efficiency of the grating can be maximized, and a large-sized liquid crystal display that does not include a color filter.

According to an aspect of the present invention, there is provided a direct light type backlight unit comprising: a plurality of light emitting devices slanted at a predetermined angle on a substrate; and a grating which diffracts incident light from the light emitting devices at different diffraction angles to separate the incident light into a plurality of colored light beams.

The light emitting devices may be light emitting diodes.

The backlight unit may further comprise installation units that are arranged on the substrate and have mounting surfaces inclined at a predetermined angle, and the light emitting devices may be mounted on the mounting surfaces.

According to another aspect of the present invention, there is provided a liquid crystal display device realizing a color image without using a color filter, the liquid crystal display comprising: a liquid crystal panel which forms a color image; and a direct type backlight unit that is disposed on a lower portion of the liquid crystal panel, comprising: a plurality of light emitting devices slanted at a predetermined angle on a substrate; and a grating which diffracts incident light from the light emitting devices at different diffraction angles to separate the incident light into a plurality of colored light beams.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF ILLUSTRATIVE, NON-LIMITING EMBODIMENTS OF THE INVENTION

Figure 1:
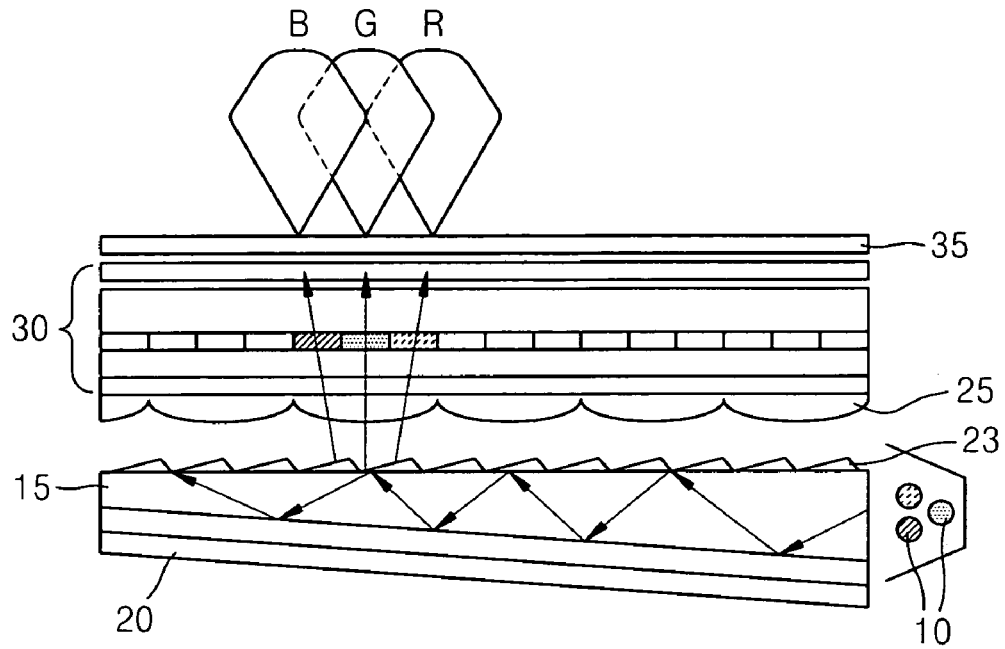
FIG. 1 is a conventional liquid crystal display having an edge light type backlight unit without a color filter.
Figure 2:
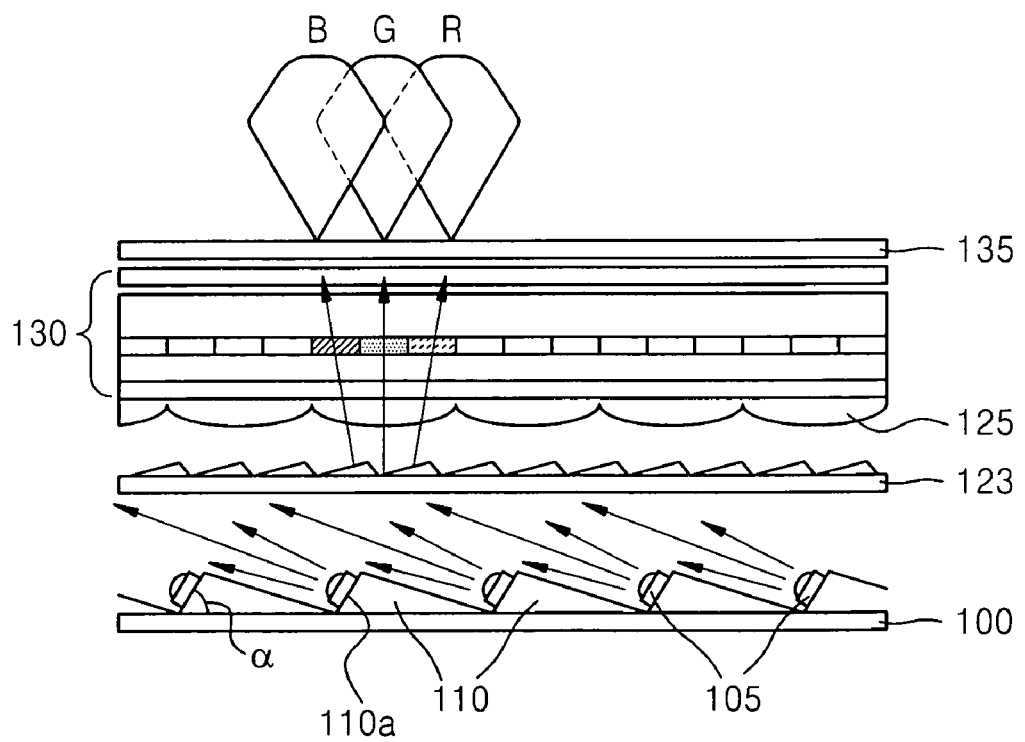
FIG. 2 is a liquid crystal display having a direct light type backlight unit without a color filter according to an exemplary embodiment of the present invention.

Referring to FIG. 2, a backlight unit according to an illustrative, non-limiting embodiment of the present invention includes direct light type light emitting devices 105 which are disposed below a liquid crystal panel 130 and a grating 123 diffracting incident light from the light emitting devices 105 at different angles according to wavelength.

The light emitting devices 105 are disposed at a predetermined angle α on a substrate 100, and thus, most of the light emitted from the light emitting devices 105 is incident at a predetermined angle to the grating 123. To install the light emitting devices 105 inclined to the substrate 100, installation units 110 having mounting surfaces 110a are formed on the substrate 100 and the light emitting devices 105 are installed on the mounting surfaces 110a. Thus, a backlight unit having light emitting devices which emit controlled light incident on the grating 123 at an optimal angle of incidence can be realized.

The light emitting devices 105 may be, but are not limited to, light emitting diodes or laser diodes. The light emitting diodes may be, for example, white light emitting diodes or a plurality of color light emitting diodes emitting light of a particular wavelength band. When a plurality of color light emitting diodes are used, the colored light from each light emitting diode is mixed to form white light, and the white light is incident on the grating 123.

The grating 123 diffracts the incident light at different diffraction angles according to wavelength, thereby separating the incident light into a plurality of colors of light. Since the diffraction efficiency varies according to the angle of incidence of the incident light, the optimal angle of incidence providing maximum diffraction efficiency may vary according to the pattern of the grating 123. The predetermined angle $\alpha$ of the light emitting devices 105 is adjusted to obtain the optimal angle of incidence. For example, the angle $\alpha$ may be 30°, 40° or 45°, although the present invention is not limited to these particular examples. When the light emitting devices 105 are disposed parallel to the substrate 100, the light radially emitted from the light emitting devices 105 is all incident at an angle to be symmetric with respect to the grating 123. Thus, it is difficult to direct the light emitted from the light emitting devices 105 onto the grating 123 at an optimal angle of incidence. However, when the light emitting devices 105 are slanted at a predetermined angle $\alpha$ to the substrate 100, a portion of the light emitted from the light emitting devices 105 is incident on the grating 123 at an angle of incidence equal to the predetermined angle $\alpha$.

The light which is separated into a plurality of colored light beams, such as red light (R), green light (G), and blue light (B), is focused onto pixels of the liquid crystal panel 130 through a cylindrical micro lens array 125. The liquid crystal panel 130 forms an image by switching the pixels on and off according to input image signals. As the configuration of the liquid crystal panel 130 is well known, the description thereof will be omitted for the sake of brevity.

The viewing angle is secured by diffusing a color image formed by the liquid crystal panel 130 with a diffuser 135.

The liquid crystal display device consistent with the present invention realizes a color image with a direct light type backlight unit and without the use of a color filter. Furthermore, since a light source arrangement supplies sufficient light to a large-sized liquid crystal display using a direct light type backlight unit and the light sources can be uniformly arranged behind the liquid crystal panel, a large-sized liquid crystal panel with light uniformity can be obtained.

As described above, a backlight unit and a liquid crystal display consistent with the present invention include a direct light type light source emitting light at an optimal angle to provide maximum diffraction efficiency of the grating in a grating structure that allows color image realization without the use of a color filter. Thus, light can easily enter the grating, and a large-sized liquid crystal display using a direct light type backlight unit is provided.

While the present invention has been particularly shown and described with reference to exemplary embodiments thereof, it will be understood by those of ordinary skill in the art that various changes in form and details may be made thereto without departing from the spirit and scope of the present invention as defined by the following claims.

What is claimed is:

1. A direct light type backlight unit comprising:
   a plurality of light emitting devices slanted at a predetermined angle on a substrate; and
   a grating which diffracts incident light from the light emitting devices at different diffraction angles to separate the incident light into a plurality of colored light beams;
   wherein light emitted from the plurality of light emitting devices is slantingly incident onto the grating.

2. The backlight unit of claim 1, wherein the light emitting devices comprise light emitting diodes.

3. The backlight unit of claim 1, further comprising installation units that are arranged on the substrate and have mounting surfaces that are inclined at a predetermined angle, wherein the light emitting devices are mounted on the mounting surfaces.

4. The backlight unit of claim 1, wherein the predetermined angle is equal to the angle of incidence of the incident light at which the diffraction efficiency of the grating is maximum.

5. A liquid crystal display device which realizes a color image without using a color filter, the liquid crystal display comprising:
   a liquid crystal panel which forms a color image; and
   a direct type backlight unit that is disposed on a lower portion of the liquid crystal panel, comprising:
      a plurality of light emitting devices slanted at a predetermined angle on a substrate; and
      a grating which diffracts incident light from the light emitting devices at different diffraction angles to separate the incident light into a plurality of colored light beams.

6. The liquid crystal display device of claim 5, wherein the light emitting devices comprise light emitting diodes.

7. The liquid crystal display device of claim 5, further comprising installation units that are arranged on the substrate, and have mounting surfaces that are inclined at a predetermined angle, wherein the light emitting devices are mounted on the mounting surfaces.

8. The liquid crystal display device of claim 5, wherein the predetermined angle is equal to the angle of incidence of the incident light at which the diffraction efficiency of the grating is maximum.

9. The liquid crystal display device of claim 5, further comprising a cylindrical micro lens array interposed between the grating and the liquid crystal panel to focus light from the grating onto the liquid crystal panel.

10. The liquid crystal display device of claim 5, further comprising a diffuser which diffuses a color image formed by the liquid crystal panel.

* * * * *

UNITED STATES PATENT AND TRADEMARK OFFICE
CERTIFICATE OF CORRECTION

PATENT NO.      : 7,659,951 B2                                          Page 1 of 1
APPLICATION NO. : 11/476621
DATED           : February 9, 2010
INVENTOR(S)     : Sang-moo Park It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 538 days.

Signed and Sealed this

Twenty-eighth Day of December, 2010

David J. Kappos
*Director of the United States Patent and Trademark Office*